United States Patent [19]
Elkins

[11] Patent Number: 5,515,754
[45] Date of Patent: May 14, 1996

[54] ROTARY HAND TOOL

[75] Inventor: Quentin L. Elkins, Kettering, Ohio

[73] Assignee: Cooper Industries, Inc., Houston, Tex.

[21] Appl. No.: 255,476

[22] Filed: Jun. 8, 1994

[51] Int. Cl.$^6$ .................................................. B25B 23/16
[52] U.S. Cl. ...................... 81/177.9; 81/177.7; 403/106;
 403/157; 403/319
[58] Field of Search ................................ 81/177.7, 177.8,
 81/177.9; 403/93, 106, 107, 319, 315, 157

[56] References Cited

U.S. PATENT DOCUMENTS

| | | |
|---|---|---|
| 1,642,569 | 9/1927 | Winslow . |
| 1,752,703 | 4/1930 | Simson . |
| 2,277,961 | 3/1942 | Detmers . |
| 2,465,152 | 11/1945 | Ellison . |
| 2,518,139 | 8/1950 | Hallowell et al. .................. 81/177.9 X |
| 2,603,981 | 7/1952 | Snyder ....................................... 403/157 |
| 2,712,765 | 7/1955 | Knight, Jr. . |
| 2,715,926 | 8/1955 | Harris . |
| 3,068,728 | 12/1962 | Shepherd . |
| 3,388,622 | 6/1968 | Klang . |
| 4,825,734 | 5/1989 | Schwalbe et al. ...................... 81/177.9 |
| 4,974,477 | 12/1990 | Anderson . |
| 5,142,953 | 9/1992 | Lin ................................................ 81/63 |
| 5,329,834 | 7/1994 | Wong .................................. 81/177.8 X |

FOREIGN PATENT DOCUMENTS

| | | |
|---|---|---|
| 2715379 | 10/1978 | Germany . |
| 90037022 | 6/1990 | Germany . |
| 0416218A3 | 3/1991 | Germany . |
| 91073774 | 9/1991 | Germany . |

Primary Examiner—James G. Smith
Attorney, Agent, or Firm—Conley, Rose & Tayon

[57] ABSTRACT

The rotary wrist motion hand tool of the present invention includes a grip member having an insert and a bit holder having an attachment member. The attachment member has one end formed by two opposed prongs with a recess between the prongs for slidingly receiving one end of the insert. Both prongs have apertures through their centers which are aligned with a hole in the insert. The insert and the attachment member are rotatably attached by passing a pin through the apertures of the prongs and the hole of the insert. In circumstances requiring high torque, the operator may manually rotate the grip member of the hand tool ninety degrees so that the longitudinal axes of the insert and the attachment member are perpendicular.

27 Claims, 7 Drawing Sheets

ROTARY HAND TOOL

BACKGROUND OF THE INVENTION

This invention pertains to the field of hand-powered tools, more particularly to hand-powered tools used to drive fasteners or bolts, and more particularly to hand-powered tools which employ wrist motion to turn the driving shank. The present invention is a wrist-motion rotary hand tool which by easy manipulation, the components may be shifted from a low-torque arrangement into a high-torque-applying relationship.

Wrist motion driving tools are well known in the art. Conventional hand drivers are designed with coaxial components. Hand powered tools of this nature do not provide sufficient torque to tighten or loosen fasteners, such as screws or bolts, which are wedged or nested in place.

To overcome the above deficiency, different types of hand driven tools have evolved. Such devices often implement a non-linear shank to create greater torque during operation. U.S. Pat. No. 4,974,477 to Anderson teaches a wrist motion hand tool with a S-curve shaped shaft having a mount to receive tool driving or drilling inserts. U.S. Pat. No. 2,712,765 to Knight discloses a wrist motion hand tool having a box end for receiving a socket-type adaptor for attaching screwdriver heads and the like. U.S. Pat. No. 2,277,961 to Detmers discloses a brace adaptable for receiving screw and nut drivers. U.S. Pat. No. 1,752,703 to Simson discloses a hand drill or screwdriver having a handle angled with respect to the shank to allow wrist motion to rotate the shank. U.S. Pat. No. 1,642,569 to Winslow, et al. discloses a hand tool having an angled set off handle, and either a screwdriver or mounting chuck in rotary engagement with the handle.

Although the more advanced hand drivers disclosed in these and other patents have increased torque capabilities compared to the conventional designs, these devices still have deficiencies. Specifically, the insert bit of these devices can easily slip off the fastener in situations that demand high torque. Accidental slippage may result in injury to the operator, and may also gall or strip the threads or otherwise deform the fastener. Accordingly, previous designs have proved to be unreliable in circumstances requiring high torque.

SUMMARY OF THE INVENTION

The present invention is a rotary wrist motion hand tool having interchangeable driver members for driving nuts, bolts, screws and related fasteners. The preferred embodiment of the rotary wrist motion hand tool includes a high impact plastic handle with fluted sides for easy gripping. One end of the handle is permanently attached to an insert, which has a hole through its center. The sides and one end of the insert have grooved and rounded detentes formed in them.

Adjacent the insert is an attachment member having one end formed by two opposed prongs with a recess between the prongs for slidingly receiving the one end of the insert. Both prongs have an aperture through their centers which is aligned with the hole in the insert when the insert is received between the two prongs of the attachment member. The insert and the attachment member are rotatably attached by passing a pin through the apertures and the hole. In circumstances requiring low torque, the operator uses the hand driver with the axes of the insert and the attachment member in alignment. However, when high torque is required, the operator may rotate the insert ninety degrees in either direction so that the axes of the insert and the attachment member are perpendicular. In the rotated position, the hand tool can generate greater torque.

A cylindrical bore extends along the axis of the attachment member beginning at the ends of the two opposed prongs and terminates at approximately the center of the attachment member. The cylindrical bore contains a compression spring and a ball bearing that fits into one of the detentes of the insert. The force created by the spring against the ball pushes the ball firmly in the detente so that a frictional force exists between the ball and the insert. The frictional force prevents the insert and the attachment member from rotating. Additionally, a locking sleeve rotatably attached to the attachment member may be used to further prevent rotation of the insert and attachment member.

One end of a bit shaft is fixedly attached to the other end of the attachment member. The other end of the bit shaft is connected to a bit adaptor that has a bore for receiving any type of driver member, which may be used to drive nuts, screws, bolts or any related fastener. The driver member may be manually changed by the operator to fit the fastener.

The hand tool of the present invention provides many of the advantages of power-driven rotary hand tools without the associated high costs. Because the design is relatively simple, the present invention is inexpensive to manufacture, durable, and easy to operate. Additionally, the design of the present invention allows the operator to generate substantially more torque than ordinary hand drivers of the same length when the axes of the insert and attachment member are perpendicular. Moreover, the present invention allows the operator to apply greater torque without sacrificing control over the tool. Accordingly, the hand tool of the present invention is more efficient and more reliable than previous devices.

Other objects and advantages of the invention will appear from the following description.

BRIEF DESCRIPTION OF THE DRAWINGS

For a detailed description of a preferred embodiment of the invention, reference will now be made to the accompanying drawings wherein.

DETAILED DESCRIPTION OF THE PREFERRED EMBODIMENT

Figure 1:
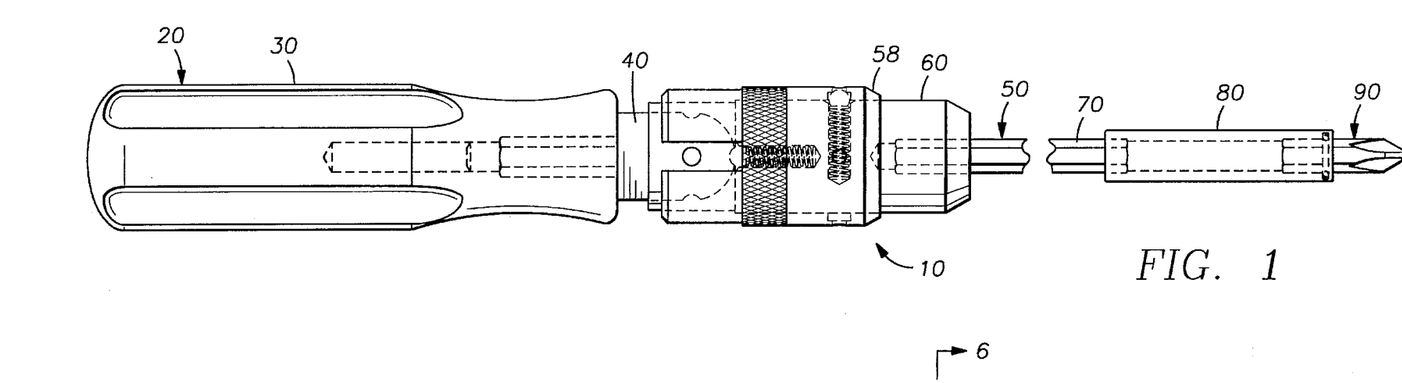
FIG. 1 is a side elevation view of the preferred embodiment of the present invention in its coaxial position.

Referring initially to FIG. 1, the rotary motion hand tool 10 of the present invention comprises a grip member 20, a bit holder 50, and a driver member 90. Grip member 20 includes a handle 30 with an insert 40. Bit holder 50 includes an attachment member 60, a locking sleeve 58, a bit shaft 70, and a bit adaptor 80. Grip member 20 is rotatably attached to bit holder 50 by means of a rotatable connection between insert 40 and attachment member 60, and driver member 90 is removably attached to bit holder 50 via bit adaptor 80. Additionally, locking sleeve 58 is rotatably attached to attachment member 60.

Figure 2:
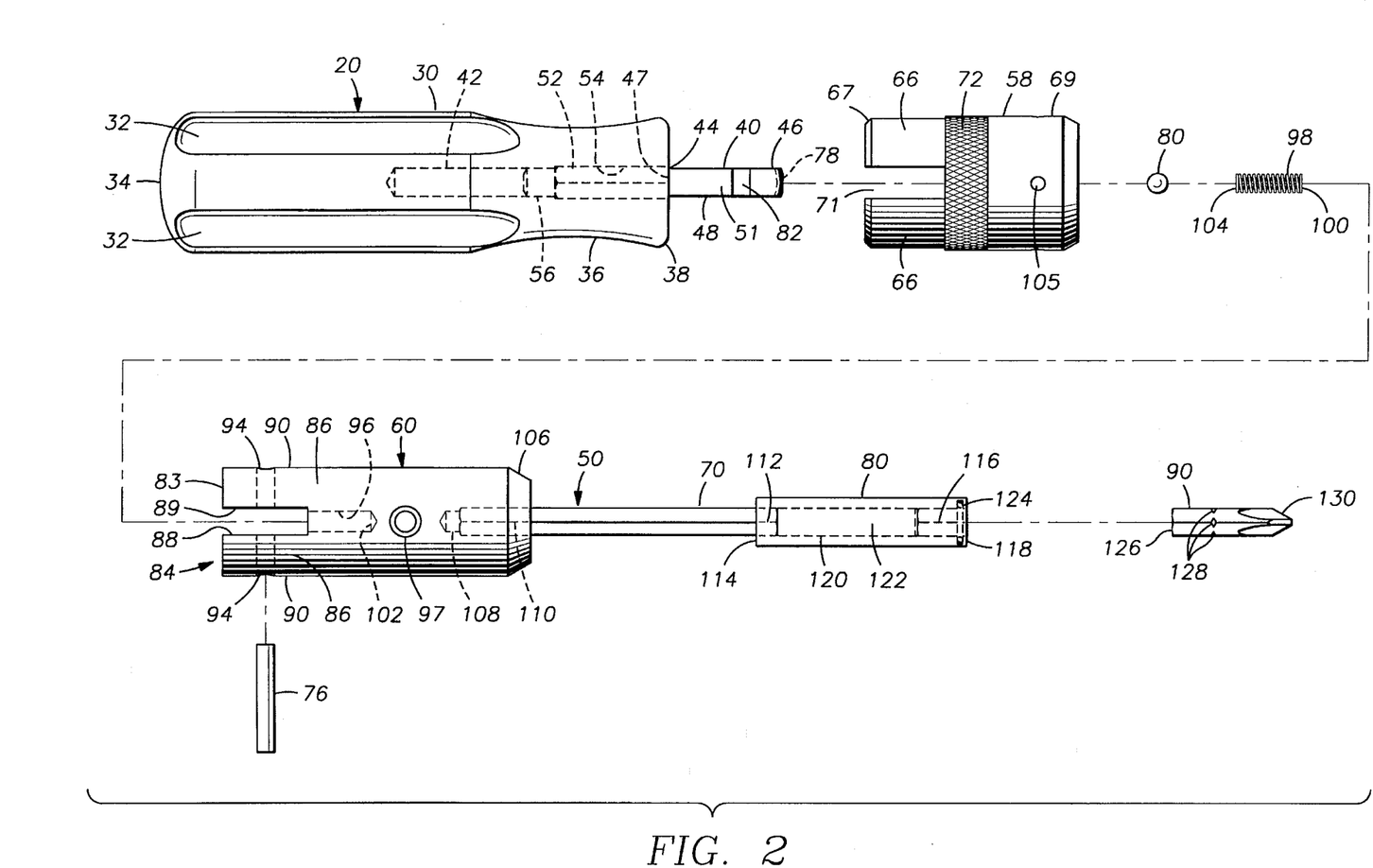
FIG. 2 is an exploded view of the preferred embodiment of the present invention.
Figures 6, 7:
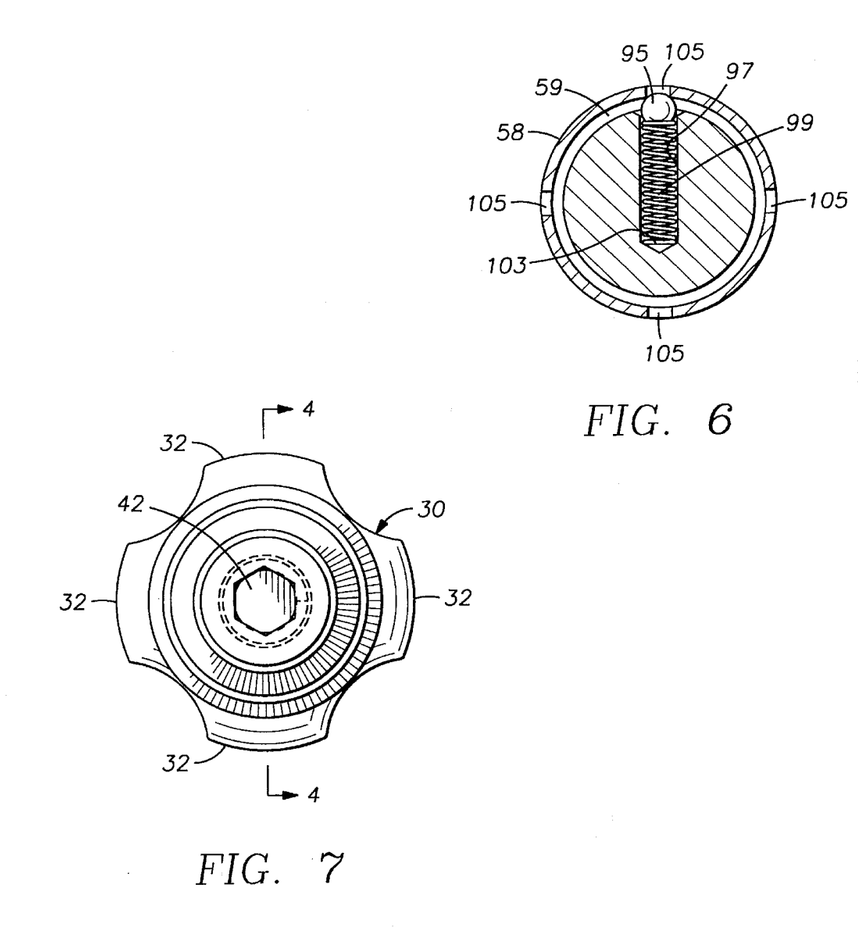
FIG. 6 is a cross section view of the preferred embodiment of the present invention taken along lines 6—6 of FIG. 4.
FIG. 7 is an end view of the preferred embodiment of the present invention.

Referring now to FIGS. 2 and 7, the handle 30 of grip member 20 has flutes 32 which extend longitudinally and are azimuthally spaced about its circumference. The flutes 32 terminate at one end in a rounded base end 34 and in a radial taper on the other end 36, which terminates in the shape of a rounded lip 38. The flutes 32 are disposed equidistant to each other on the outer circumference of handle 30 and have a curved shaped cross-section, shown best in FIG. 7.

Handle 30 includes a cylindrical blind bore 42 along its axis and extending from end 36. Bore 42 originates from the tapered end 36 of handle 30 and extends along the axis of handle 30, terminating at approximately the center of handle 30. Handle 30 is constructed of high-impact plastic material that allows it to be machine bored without substantial detrimental effect to its strength or durability.

Figures 3, 12, 13:
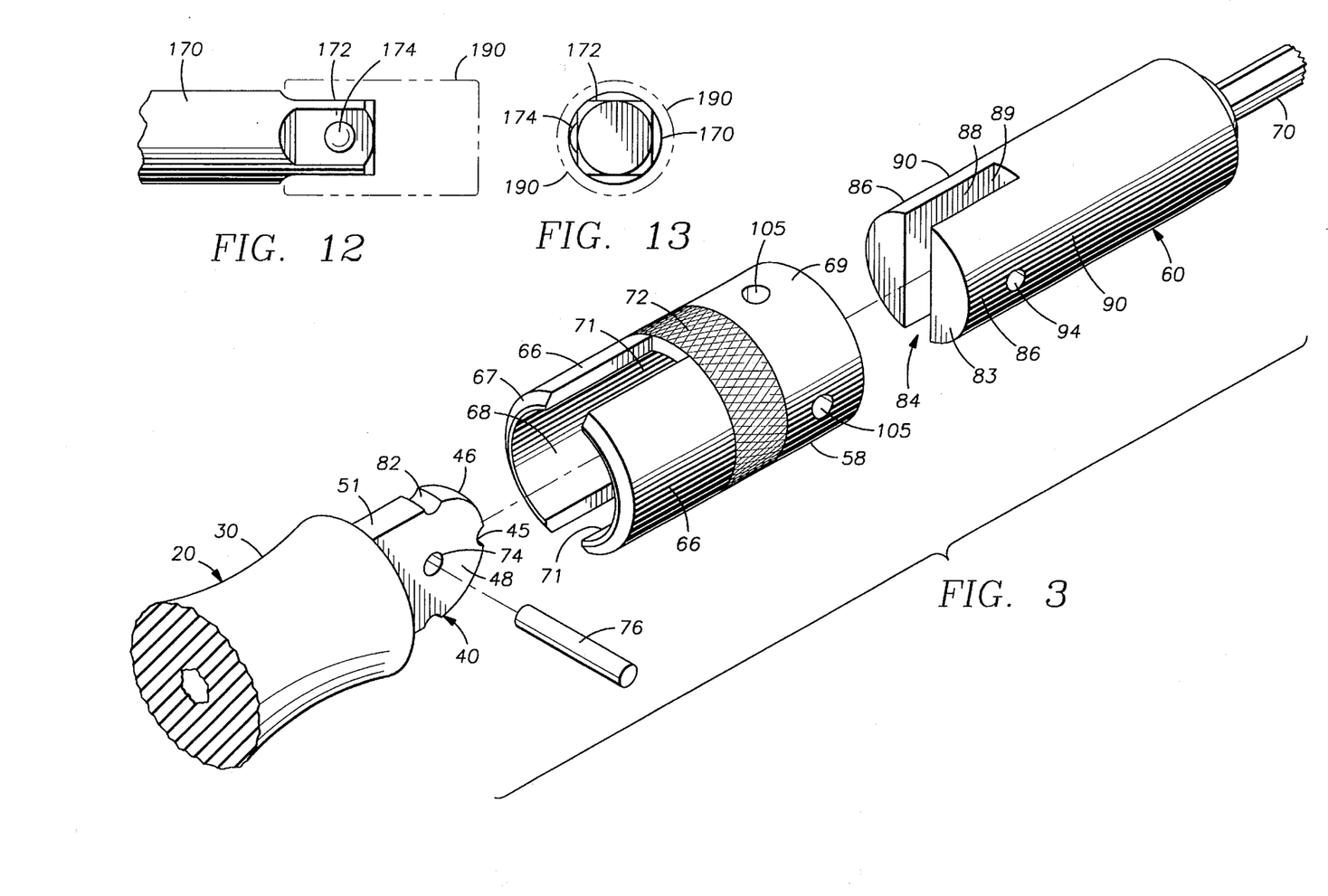
FIG. 3 is an exploded and enlarged perspective view of the rotatable joint of the preferred embodiment of the present invention.
FIG. 12 is an elevation view of an alternative bit shaft for the present invention.
FIG. 13 is an end view of the alternative bit shaft.

Referring now to FIGS. 2 and 3, insert 40 of grip member 20 is constructed of steel and includes a shaft 44 coaxially projecting from a tongue 46. The shaft 44 has an enlarged diameter portion 54 with side flats 52 and a smaller diameter end portion forming a pilot end 56. The pilot end 56 is cylindrical in cross section and is dimensioned to conform to the diameter of bore 42. The enlarged portion 54 of shaft 44, on the other hand, has a diameter greater than the diameter of bore 42. Tongue 46 forms a pair of shoulders 47 adjacent shaft 44 for bearing against handle end 36.

Handle 30 and insert 40 are fixedly attached by pressing the shaft 44 of insert 40 into the bore 42 of handle 30. This is accomplished by first inserting the pilot end 56 of shaft 44 into cylindrical bore 42. This portion of shaft 44, which serves as a guide means during attachment, is shaped to conform to the dimensions of cylindrical bore 42 of handle 30. As the enlarged diameter portion 54 of shaft 44 enters bore 42, the shape of bore 42 deforms to the dimensions of enlarged diameter portion 54. In this manner, bore 42 and shaft 44 form an inferference fit that enhances the integrity of the tool design.

Tongue 46 is a generally rectangular member forming two parallel planar faces 48 and top and bottom transverse sides 51. Shaft 44 projects from that end of tongue 46 forming shoulders 47 and tongue 46 has an opposite end 45, which is rounded. Tongue 46 of insert 40 includes a hole 74 through the center of parallel faces 48, shown best in FIG. 3. The hole 74 of insert 40 is sized to receive a roll pin 76. The terminal end 45 of the tongue 46 of insert 40 is machined to form a center detente 78 in insert 40. Center detente 78 is precision shaped to receive a ball 80, as hereinafter described, which may be constructed of steel. Additionally, two grooved detentes 82 are located on top and bottom sides 51 of tongue 46.

Referring to FIGS. 2, 3, 4 and 6, locking sleeve 58, which is constructed of steel, is generally in the shape of a hollow cylinder having an inner surface 68, shown best in FIG. 3. The locking sleeve 58 has two opposed prongs 66 at one end 67. The prongs 66 of locking sleeve 58 are hollow on the inner surface 68 and form two slots 71 dimensioned to receive the tongue 46 of insert 40.

On the outer surface of locking sleeve 58, directly below slots 71, is a knurl 72, to aid in gripping locking sleeve 58. Four apertures 105 are located on the second end 69 of locking sleeve 58. On the inner surface 68 of the other end 69 is a groove 59, shown in FIG. 4. The groove 59 is disposed around the inner circumference of end 69 of locking sleeve 58 and is aligned with the four apertures 105. The groove 59 is sized to receive a ball 95, also shown in FIG. 4.

Referring again to FIGS. 2 and 3, one end 83 of attachment member 60, which is constructed of steel, includes a yoke 84 formed by two opposed prongs 86, shown best in FIG. 3. Both prongs 86 have a flat inner face 88 and an outer arcuate face 90. The prongs 86 of attachment member 60 form a slot 89 dimensioned to slidingly receive the tongue 46 of insert 40 between the inner faces 88 of the prongs 86. Both prongs 86 have aligned apertures 94 that are sized to receive the roll pin 76. The apertures 94 may be aligned with the hole 74 in insert 40 when insert 40 is placed between the two prongs 86. Upon alignment of hole 74 and two apertures 94, roll pin 76 may be inserted through all three openings, thereby rotatably attaching insert 40 and attachment member 60 in the plane of parallel faces 48 and inner faces 88. In this fashion, grip member 20 is rotatably mounted on bit holder 50.

Figure 4:
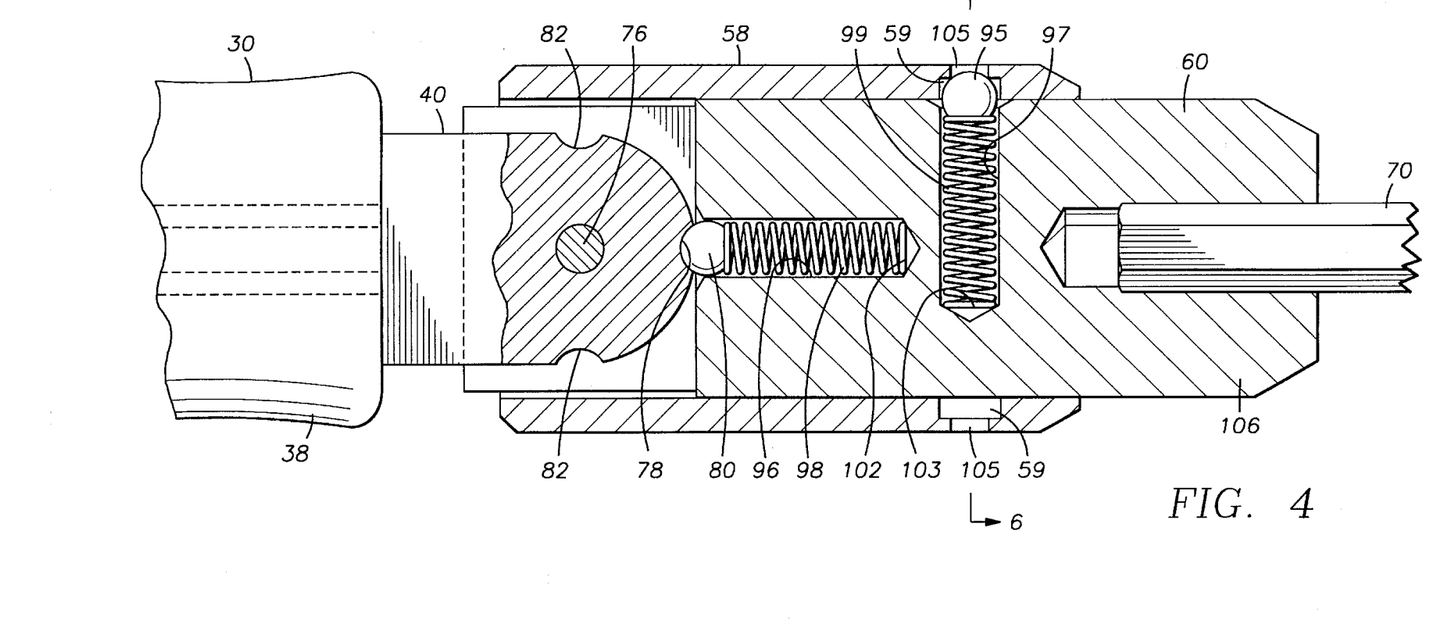
FIG. 4 is a cross section of the rotatable joint of the preferred embodiment of the present invention taken along lines 4—4 of FIG. 7.

Referring to FIGS. 2 and 4, attachment member 60 has a cylindrical blind bore 96 through its center. Bore 96 originates at a point between the lower ends of the prongs 86 and extends approximately half way through the body of attachment member 60. The bore 96 extends along the axis of attachment member 60 and lies in a plane that is parallel to the planes of the two prongs 86.

Figure 5:
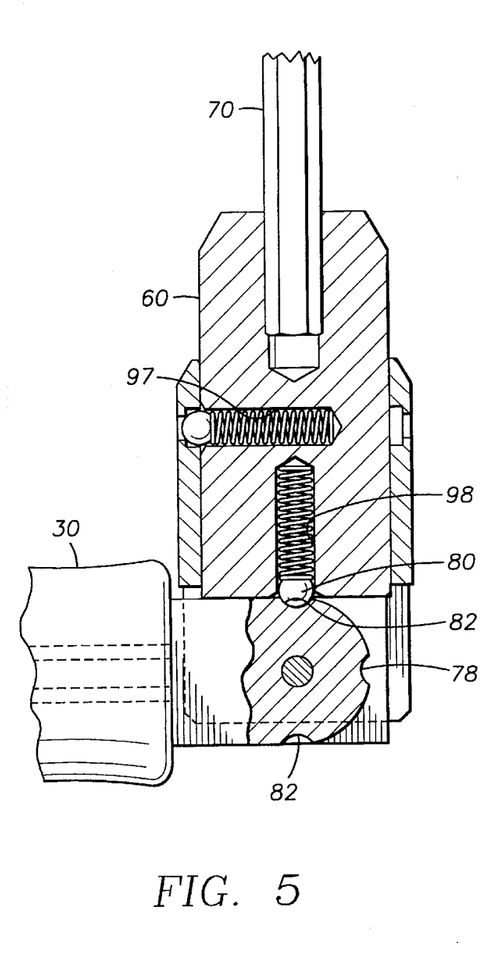
FIG. 5 is a cross section view similar to FIG. 4 showing the orientation of the handle of the tool after full rotation from its coaxial position.

A compression spring 98, such as a standard coil spring, and the ball 80, which may be a 3/16's inch diameter standard steel ball bearing, are received within the bore 96 of attachment member 60, shown best in FIG. 4. One end 100 of spring 98 rests against the bottom 102 of blind bore 96. The ball 80 is interposed between the other end 104 of spring 98 and insert 40. The ball 80 is adapted to fit into one of the detentes 78 or 82 of insert 40 when insert 40 and attachment member 60 are attached, as shown in FIGS. 4 and 5. The spring 98 biases ball 80 into the desired detente, and the force provided by spring 98 against the ball 80 pushes the ball 80 firmly into the detente. Under normal conditions, the force applied by spring 98 is sufficient to allow the ball 80 to act as a locking mechanism for insert 40 and attachment member 60. However, the force is not too strong so as to prevent rotation of insert 40 when locking sleeve 58 is in the unlocked position as shown in FIG. 5.

In the center portion of attachment member 60 is another blind bore 97 transverse to the axis, shown best in FIGS. 4 and 6. A compression spring 99, such as a standard coil spring, and a ball 95, which may be a 3/16's inch diameter standard ball bearing, are received within bore 97 of attachment member 60. One end of spring 99 rests against the bottom 103 of blind bore 97. The ball 95 is interposed between the other end of spring 99 and locking sleeve 58, which is sized to fit directly over attachment member 60 so that slots 71 of locking sleeve 58 and slot 89 of attachment member 60 may be aligned.

The inner groove 59 of locking sleeve 58 receives the ball 95 when locking sleeve 58 and attachment member 60 are attached, as shown in FIG. 4. The spring 99 biases the ball 95 into the groove 59, allowing the locking sleeve 58 to rotate 360° on the attachment member 60. In this fashion, the locking sleeve 58 is rotatably mounted on attachment member 60. The locking sleeve rotates in ninety degree increments until the spring 99 biases the ball 95 into one of the apertures 105 of locking sleeve 58. In one position, i.e., the unlocked position, the slots 71 of locking sleeve 58 are aligned with slot 89 of attachment member 60. This allows for rotation of insert 40. In a second position, i.e., the locked position, the locking sleeve 58 is rotated 90° so that slots 71 of locking sleeve 58 and slot 89 of attachment member 60 are not aligned, preventing rotation of insert 40.

Still referring to FIGS. 2 and 4, the other end 106 of attachment member 60 includes a bore 108 along the axis of attachment member 60. Bore 108 is formed by first drilling a cylindrical hole and then using a hexagon punch to broach a hexagonal bore. Adjacent to this end 106 of attachment member 60 is bit shaft 70, which is constructed of steel and is hexagonal in cross-section. Attachment member 60 and bit shaft 70 are fixedly attached by inserting one end 110 of bit shaft 70 into the bore 108 of attachment member 60. The flats of bit shaft 70 are dimensioned to be received by the flats of bore 108. However, because the corners of the hexagonal bore 108 are slightly undersized, the corners of bore 108 deform to engage the corners of bit shaft 70 as bit shaft 70 is driven into bore 108. The close tolerance fit dictated by this design enhances the overall strength and reliability of the tool.

A cylindrical bit adaptor 80 is disposed on the other end of bit shaft 70. Bit adaptor 80 has a cylindrical bore 112 in one end 114 and a hexagonal bore 116 in the other end 118. Bore 116 is formed to receive all standard ¼ inch hex insert bits. Bit adaptor 80 and bit shaft 70 are fixedly attached by inserting end 120 of bit shaft 70 into bore 112 in the same manner described above. A cylindrical locking magnet 122, which may be constructed of an aluminum, nickel and cobalt composition, is located in a recess between bores 112 and 116 of bit adaptor 80. In the preferred embodiment, magnet 122 is approximately ¼ inch in diameter and 1⅛ inches long. However, one skilled in the art will recognize that magnet 122 may have various sizes. Additionally, a C-shaped locking ring 124 is disposed in hexagonal bore 116 at its terminal end 118. Locking ring 124 is constructed of a flexible and resilient steel material.

The driver member 90 in the preferred embodiment is a standard ¼ inch hex insert bit, which may be used to drive nuts, screws, bolts or any related fasteners. One skilled in the art will recognize that driver member 90 may have various forms and dimensions. The body of driver member 90 in the preferred embodiment is hexagonal in cross-section with a slightly curved top 126. Six detentes 128 are formed near the center of the body of driver member 90 at the edges of its sides. The shape of terminal end 130 of driver member 90 depends on the type of fastener being manipulated. A screw driver head is depicted at terminal end 130 in FIG. 2.

Driver member 90 is removably attached to bit adaptor 80 by manually inserting the top 126 of driver member 90 into bore 116 of bit adapter 80. When inserted, the locking ring 124 engages the sides of driver member 90 at detentes 128 to hold driver member 90 securely in place. The top 126 of the fully inserted driver member 90 contacts locking magnet 122 and magnet 122 magnetizes driver member 90 so that a fastener may be magnetically attached to driver member 90.

In operation, grip member 20 is manipulated by the operator's hand, as driver member 90 engages the fastener, such as a nut or screw. Before operation begins, the user must first select the appropriate driver member 90. A typical driver member 90 for driving screws is depicted in FIGS. 1 and 2. In the event that the fastener is something other than a screw, such as a nut or a bolt, the operator may manually remove driver member 90 from bit adaptor 80 by simply pulling driver member 90 out of bit adaptor 80. The user then replaces the old driver member 90 with a new one of appropriate shape and dimensions to engage the fastener. The new driver member can be attached to bit adaptor 80 by forcing the top 126 of driver member 90 into the hexagonal bore 116 of bit adaptor 80 until the locking ring 124 engages the detentes 128 of driver member 90. At this point, the user is ready to operate the tool.

The orientation of grip member 20 during operation depends on the amount of torque needed to turn the fastener. Under normal circumstances, the fastener may be loosened or tightened in accordance with conventional techniques by applying only a minimal amount of force. In this low-torque situation, all the components of hand tool 10 are axially aligned, as shown in FIGS. 1 and 4, and the ball 80 is disposed in the center detente 78 of insert 40. The force generated by compression spring 98 creates frictional force at the contact point between the surface of the ball 80 and the center detente 78 to prevent rotation of insert 40 and handle 30 during operation. Additionally, while operating the hand tool 10 in a low-torque situation, locking sleeve 58 should be in the locked position, shown in FIG. 4, to further prevent rotation of insert 40. Locking sleeve 58 is easily placed in the locked position by rotating locking sleeve 58 until the ball 95 engages one of the apertures 105 and the slots 71 of locking sleeve 58 and slot 89 of attachment member 60 are not aligned.

When greater torque is required to loosen or tighten a fastener, the operator may rotate attachment member 60 ninety degrees in the same plane as the faces 48 of insert 40 and faces 88 of attachment member 60. Before rotation, however, locking sleeve 58 must be placed in the unlocked position, shown in FIG. 5. This is accomplished by simply rotating locking sleeve 58 90° until the ball 95 engages one of the apertures 105 of the locking sleeve 58. In this position, the slots 71 of locking sleeve 58 and slot 89 of attachment member 60 are aligned, allowing rotation of insert 40. After disengaging locking sleeve 58, the operator may then rotate insert 40 by simply applying a slight upward or downward pressure, depending on the direction of rotation, to handle 20. The force applied by the user to initiate rotation need only be sufficient to overcome the frictional force created by compression spring 98 at the contact point between the ball 80 and the center detente 78 of insert 40.

After full ninety-degree rotation, shown in FIG. 5, the axis of insert 40 is perpendicular to the axis of attachment member 60. In this configuration, the ball 80 fits into one of the grooved detentes 82, depending on the direction of rotation. The frictional force created by compression spring 98 at the contact point between the ball 80 and the detente 82 secures attachment member 60 in its rotated position. This orientation of hand tool 10 allows its operator to apply increased torque to the tool. Thus, the operator can exert increased leverage to loosen or tighten the fastener.

When operating in the high-torque position illustrated in FIG. 5, the user may apply substantially more torque than an ordinary hand driver of the same length. Importantly, the design of hand tool 10 allows the operator to apply increased torque without sacrificing control over the tool. Because the operator maintains the same degree of control over the tool even in the rotated position, the present invention represents a substantial improvement over similar other devices such as breaker bars or hand drivers with bolsters, which have a tendency to slip when applying high-torque. The increased control allows hand tool 10 to be rotated rapidly with great force, while also reducing the possibility of accidental slips during operation, which may result in injury to the operator, as well as deformation of the fastener. Accordingly, the present invention is inherently safer, easier to operate and more reliable than previous devices.

Figure 8:
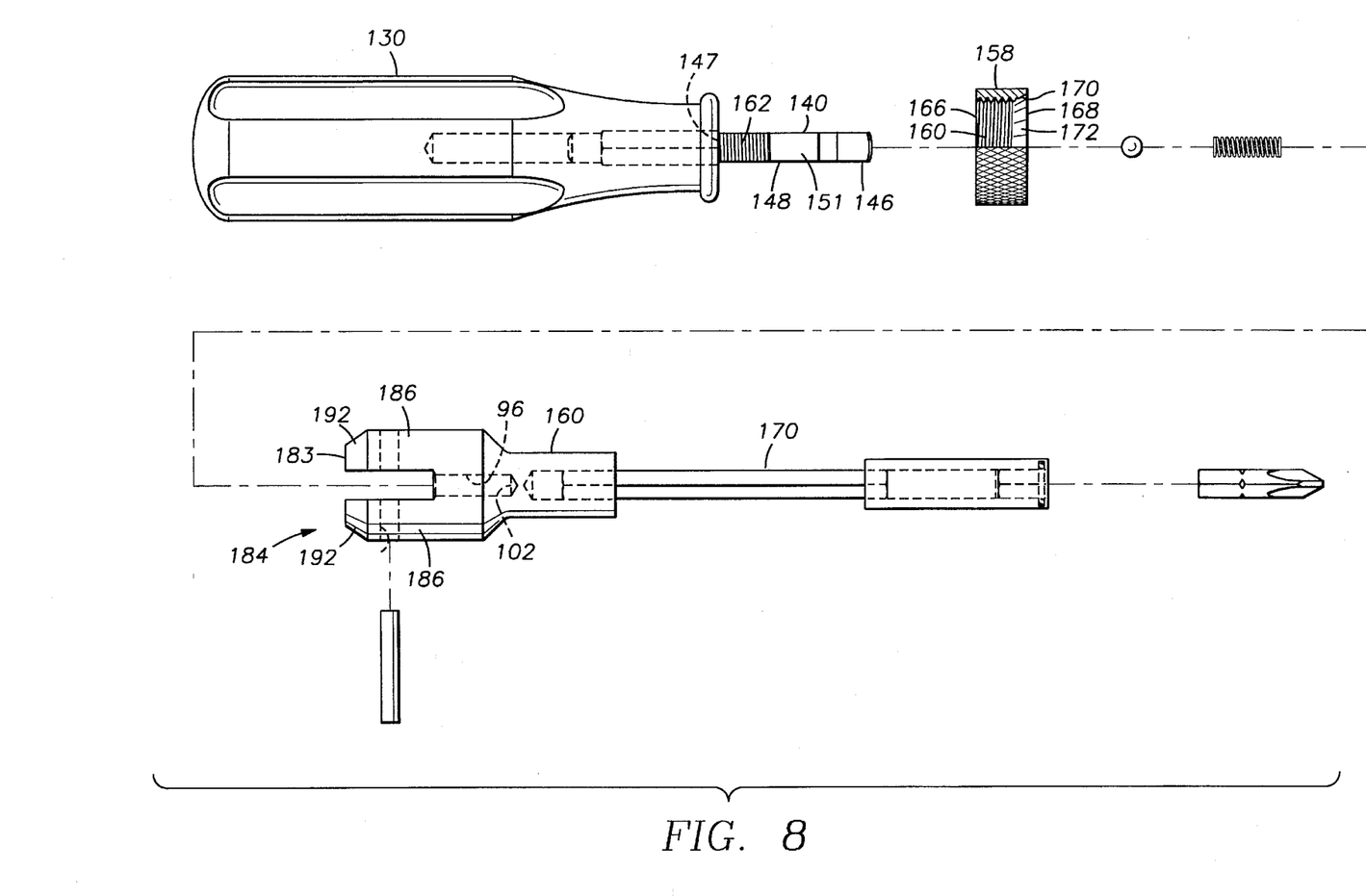
FIG. 8 is an exploded view of an alternative embodiment of the present invention.

Referring to FIG. 8, an alternative embodiment of the present invention is shown. As in the preferred embodiment, an insert 140 includes a tongue 146 which is a generally rectangular member forming two parallel planar faces 148 and top and bottom transverse sides 151. Tongue 146 forms a pair of shoulders 147 for bearing against the bottom of handle 130. A portion of top and bottom sides 151 of insert 140 is threaded at 162. Threads 162 extend from shoulders 147 to approximately the center of sides 151.

A cylindrical locking sleeve 158 with mating interior threads 160 threadingly engages threads 162 of insert 140 allowing locking sleeve 158 to be positioned on the threaded sides 151 of tongue 146. The bottom of handle 130 serves as a stop for the locking sleeve 158 when locking sleeve 158 is threaded against handle 130 in the unlocked position shown in FIGS. 10 and 11. In the unlocked position, end 166 of locking sleeve 158 abuts the bottom of handle 130. The other end 168 of locking sleeve 158 includes a counterbore 170 which has angled sides to form a conical shaped opening 172 in the interior of sleeve 158.

Figures 9, 14:
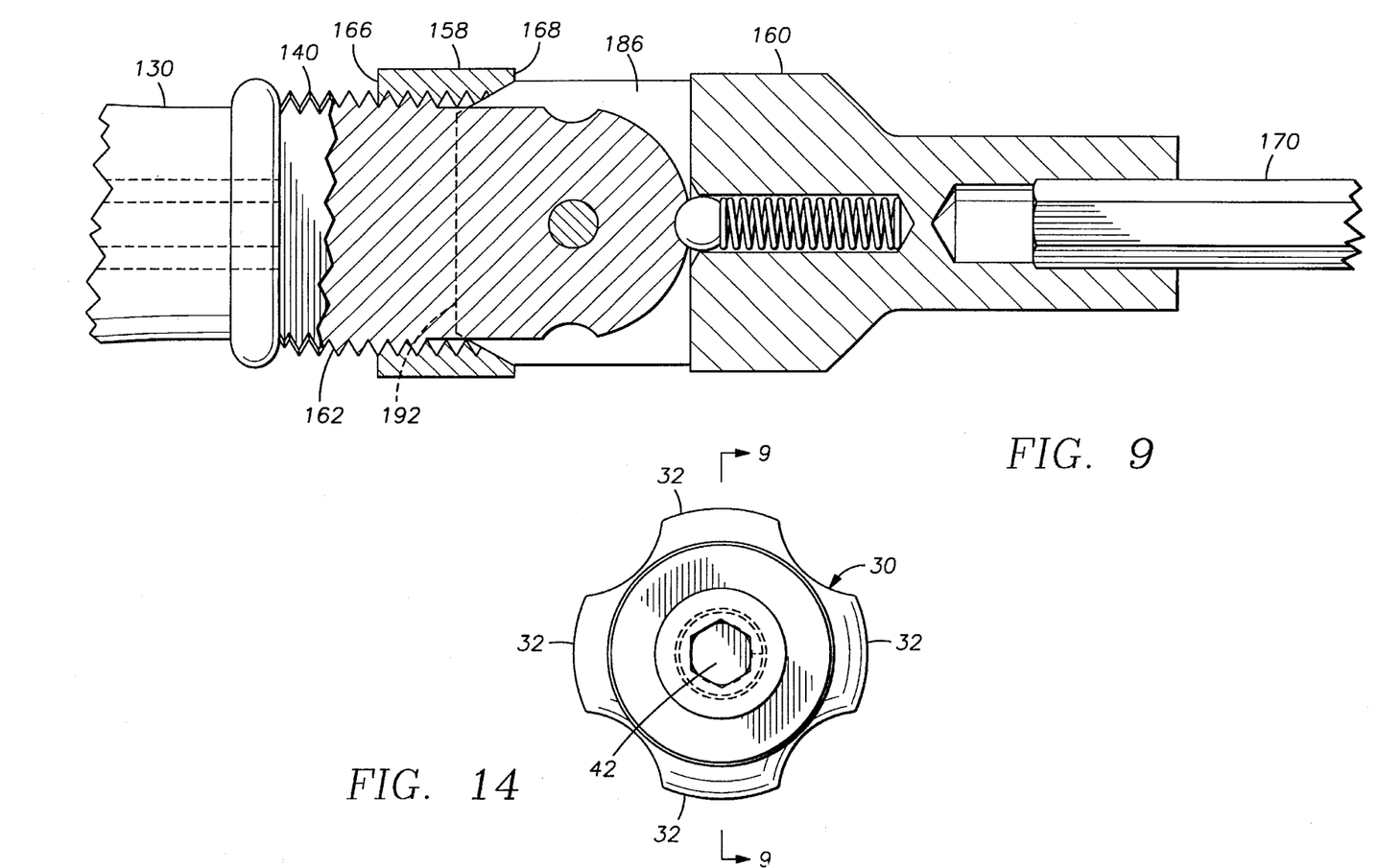
FIG. 9 is a cross section of the rotatable joint of the alternative embodiment taken along lines 9—9 of FIG. 14.
FIG. 14 is an end view of the alternative embodiment.

One end 183 of attachment member 160, includes a yoke 184 formed by two opposed prongs 186. The peripheral edges 192 of prongs 186 are chamfered to a conical shape. Opening 172 of locking sleeve 158 is dimensioned to receive the chamfered edges 192 of prongs 186 when the locking sleeve 158 is engaged in the locked position, as shown in FIG. 9.

While operating the tool in low torque situations, the locking sleeve 158 should be placed in the locked position. This is accomplished by manipulating locking sleeve 158 until the opening 172 of locking sleeve 158 receives the chamfered edges 192 of attachment member 160. This configuration prevents unintentional rotation of insert 140 when the operator wishes to operate the tool in the low-torque position.

Figures 10, 11:
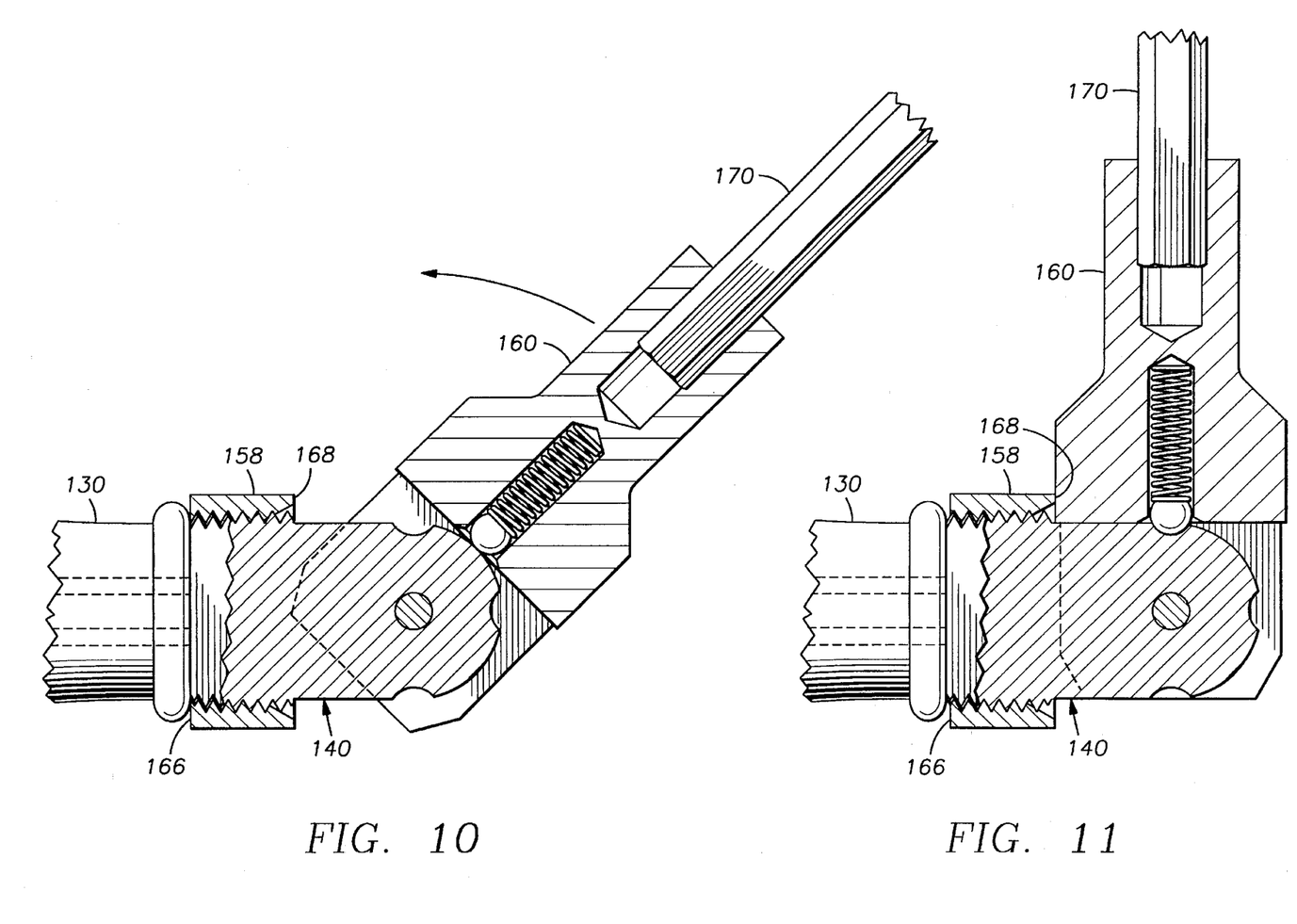
FIG. 10 is a cross section view similar to FIG. 9 showing the joint rotated from its coaxial position.
FIG. 11 is a cross section view similar to FIG. 9 showing the orientation of the handle of the tool after full rotation from the coaxial position.

When greater torque is required, the operator may rotate attachment member 160 90°. Before rotation, however, the operator must move locking sleeve 158 to the unlocked position shown in FIGS. 10 and 11. This is accomplished by manipulating locking sleeve 158 until the end 166 of locking sleeve 158 abuts the bottom of handle 130. Locking sleeve 158 will remain in this unlocked position until further manipulation by the operator. After disengaging locking sleeve 158, the operator may then rotate attachment member 160, as shown in FIG. 10, by simply applying a slight upward or downward pressure, depending on the direction of rotation, to attachment member 160 or bit shaft 170.

Referring to FIGS. 12 and 13, an alternative embodiment of the bit shaft 70 and bit holder 80 of the preferred embodiment is shown. In this design, which is well known to those skilled in the art, bit shaft 170 is tapered at end 172. The tapered end 172 is precision sized to receive a driver member 190 and has a blind bore, not shown. The bore contains a compressing spring, also not shown, and a ball 174. One end of the spring rests against the bottom of the bore and the ball 174 is interposed between the other end of the spring and the driver member 190. The driver member 190 has detentes on its inner surface which engage the ball 174 when driver member 190 is attached to the bit shaft 170. The spring biases the ball 174 into the detente of driver member 190, and the force applied by the spring is sufficient to hold the driver member 190 firmly in place during operation. This design is particularly appropriate when driver member 190 is a socket which may be used to tighten or loosen nuts or bolts.

While a preferred embodiment of the invention has been shown and described, modifications thereof can be made by one skilled in the art without departing from the spirit of the invention.

What is claimed is:

1. A hand tool supporting a bit insert for manually manipulating a fastener, comprising:

a handle having a first member;

a holder adapted for supporting the bit insert and having a second member;

said first and second members forming a rotatable joint having a first position aligning said handle with said holder and second and third positions not aligning said handle with said holder;

a third member rotatably attached to said second member and having a first locked position and a first unlocked position;

a first positioning member housed in said second member and positioning said third member in one of said first locked and first unlocked positions; and said third member locking said joint in said first position when said third member is in said first locked position and allowing said joint to rotate into said second and third positions when said third member is in said first unlocked position.

2. The hand tool of claim 1 wherein said handle is perpendicular to said holder when said joint is in said second and third positions.

3. The hand tool of claim 1 further including a second positioning member housed in said second member and positioning said joint in one of said first, second, and third positions.

4. The hand tool of claim 3 wherein said second positioning member includes an arcuate member biased against an indentation in said first member.

5. The hand tool of claim 1 further including a spring disposed in a bore within said second member for biasing a ball into a cavity in said first member to prevent unwanted rotation.

6. The hand tool of claim 1 wherein said first member is inserted into a yoke on said second member with said first member rotatably mounted on said second member.

7. The hand tool of claim 6 further including a pin passing through aligned apertures in said first and second members.

8. The hand tool of claim 1 wherein said third member has a second locked position and a second unlocked position.

9. The hand tool of claim 8 wherein said first positioning member positions said third member in one of said first locked, second locked, first unlocked, and second unlocked positions.

10. The hand tool of claim 8 wherein said third member locks said joint in said first position when said third member is in said second locked position and allows said joint to rotate into said second and third positions when said third member is in said second unlocked position.

11. The hand tool of claim 1 wherein said first positioning member includes an arcuate member biased against an indentation in said third member.

12. The hand tool of claim 1 wherein said third member has an inner surface with a groove disposed around the circumference of said inner surface.

13. The hand tool of claim 12 wherein said first positioning member includes an arcuate member biased against said groove to allow rotation of said third member.

14. A hand tool supporting a bit insert for manually manipulating a fastener, comprising:

a handle having a first member;

a holder adapted for supporting the bit insert and having a second member with a tapered end;

said first and second members forming a rotatable joint having a first position aligning said handle with said holder and second and third positions not aligning said handle with said holder;

a third member having a tapered inner wall at one end and threadingly engaging said first member so that said third member can be manipulated on said first member; and said third member locking said handle and said holder in said first position when said third member is manipulated so that said third member contacts said second member.

15. The hand tool of claim 14 wherein said first member has planar sides with threads to engage said third member.

16. The hand tool of claim 14 wherein said third member locks said handle and said holder in said first position when said third member is manipulated so that said inner wall of said third member receives said tapered end of said second member.

17. The hand tool of claim 16 wherein said first member has planar sides with threads to engage said third member.

18. The hand tool of claim 14 further including a positioning member housed in said second member and positioning said joint in one of said first, second, and third positions.

19. The hand tool of claim 18 wherein said positioning member includes an arcuate member biased against an indentation in said first member.

20. A hand tool supporting a bit insert for manually manipulating a fastener, comprising:

a handle having a first member;

a holder adapted for supporting the bit insert and having a second member;

said first and second members forming a rotatable joint having a first position aligning said handle with said holder and second and third positions not aligning said handle with said holder;

a third member rotatably attached to said second member and having an inner surface with a groove disposed around the circumference of said inner surface;

a first positioning member housed in said second member and having an arcuate member biased against said groove to allow rotation of said third member; and said third member locking said joint in said first position when said third member is rotated to a first locked position and allowing said joint to rotate into said second and third positions when said third member is rotated to a first unlocked position.

21. The hand tool of claim 20 wherein said handle is perpendicular to said holder when said joint is in said second and third positions.

22. The hand tool of claim 20 further including a second positioning member housed in said second member and positioning said joint in one of said first, second, and third positions.

23. The hand tool of claim 22 wherein said second positioning member includes an arcuate member biased against an indentation in said first member.

24. The hand tool of claim 20 wherein said third member has a second locked position and a second unlocked position.

25. The hand tool of claim 24 wherein said third member locks said joint in said first position when said third member is in said second locked position and allows said joint to rotate into said second and third positions when said third member is in said second unlocked position.

26. The hand tool of claim 20 wherein said first positioning member positions said third member in one of said first locked and said first unlocked positions.

27. The hand tool of claim 25 wherein said first positioning member positions said third member in one of said first locked, second locked, first unlocked, and second unlocked positions.

* * * * *